PRINTER FORMAT CONTROL SYSTEM
Original Filed Feb. 5, 1957 4 Sheets-Sheet 1
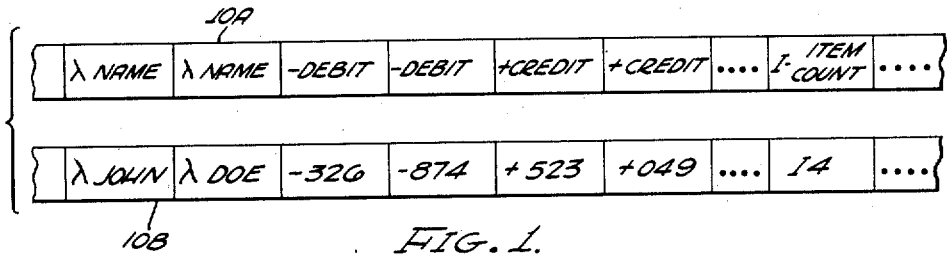
FIG. 1.
ACTIVITY PRINTOUT
| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| FORMAT △ | J | O | H | N | CODED SPACE | D | O | E | CODED SPACE | | | | | | |
| FORMAT ○ | 6 | DEBIT . | 2 | 3 | | 4 | DEBIT . | 7 | 8 | | | 3 | CREDIT . | 2 | 5 |
| | | FORMAT PRODUCED SPACES | | | | | | | | | | 9 | . | 4 | 0 |
| FORMAT □ | | | | | | ITEM COUNT 4 | | | | | | | | | |
FIG. 2.
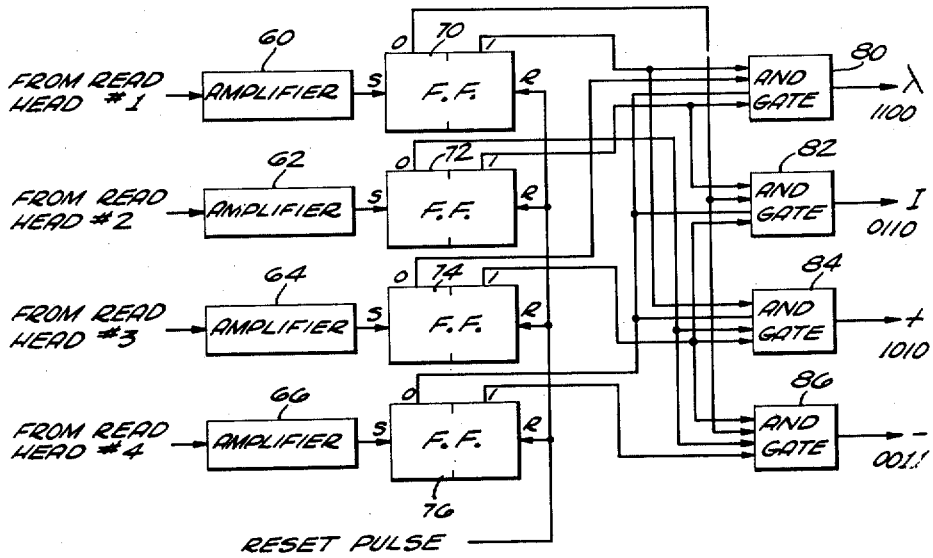
FIG. 4.
INVENTORS
JACOB GOLDBERG
BONNAR COX
BY Lyon & Lyon
ATTORNEYS

PRINTER FORMAT CONTROL SYSTEM

Original Filed Feb. 5, 1957 4 Sheets-Sheet 2

INVENTORS
JACOB GOLDBERG
BONNAR COX
BY Lyon & Lyon
ATTORNEYS

PRINTER FORMAT CONTROL SYSTEM

Original Filed Feb. 5, 1957 4 Sheets-Sheet 3

INVENTORS
JACOB GOLDBERG
BONNAR COX
BY Lyon & Lyon
ATTORNEYS

PRINTER FORMAT CONTROL SYSTEM

Original Filed Feb. 5, 1957

INVENTORS
JACOB GOLDBERG
BONNAR COX
BY Lyon & Lyon
ATTORNEYS

United States Patent Office

Re. 25,263
Reissued Oct. 16, 1962

25,263

PRINTER FORMAT CONTROL SYSTEM

Jacob Goldberg and Bonnar Cox, Palo Alto, Calif., assignors, by mesne assignments, to General Electric Company, New York, N.Y., a corporation of New York Original No. 2,874,633, dated Feb. 24, 1959, Ser. No. 638,407, Feb. 5, 1957. Application for reissue Oct. 14, 1960, Ser. No. 62,818
9 Claims. (Cl. 101—93)

Matter enclosed in heavy brackets [ ] appears in the original patent but forms no part of this reissue specification; matter printed in italics indicates the additions made by reissue.

This invention relates to output printer control apparatus employed in information-handling machines and, more particularly, to an improvement in the format control of such output printers.

Output printers are employed with information-handling machines for the purpose of printing output of the results produced by the machine after it has operated upon the data which was put into it. Output printers are also used to obtain status reports where a machine is used for inventory control or, in some instances, for bookkeeping activities. Where large amounts of data are printed out, high-speed output printers are employed. One of the high-speed printers commonly used is the type which employs the rotating cylinder, or drum, having columns of type on its periphery. At a printing position, an inked ribbon is passed adjacent the printing cylinder and paper is passed adjacent the inked ribbon. The paper and ribbon are moved slowly a line space at a time, and the drum is rotated at high speed. Means are provided for electrically indicating the type which is at the printing position. A solenoid-actuated hammer is provided for each type bar in a column of type. Thus, if in a line of data to be printed out, the type character which is at the printing position is required for several of the words to be printed along the line, the corresponding solenoid-actuated hammers are excited and they push the paper in their respective location against the inked ribbon and type bar to thereby imprint the letter or character on the paper.

The data which is sought to be printed out on the high-speed printer is usually contained within the information-handling machine in a coded form on some storage device. This storage device may take the form of magnetic tape or perforated paper tape. It may also include magnetic cores and magnetic drums. In any event, the present practice for presenting this coded data for the purpose of being printed out is to enter it into storage registers, a line of items of data at a time. Means are provided for comparing all the characters within the data items stored in the register with the information derived from the type drum as to the character appearing in the column of type at the printing position. When as a result of such comparison an identity between the type at the printing position and the characters required which are stored in the register occurs, the solenoids at the respective positions within a line for that particular character are actuated. A preferred arrangement for actuating an output printer from data stored within information-handling machines is shown, described, and claimed in an application by Jacob Goldberg and Bonnar Cox for Electronic Apparatus for High-Speed Printers, Serial No. 606,410, filed August 27, 1956, now U.S. Patent No. 2,799,222, and assigned to a common assignee.

In a high-speed output printer which presently is being manufactured and sold commercially, there are provided in each column of type eighty type characters. Thus, it is possible to print in a given line eighty characters. Where the outpupt material is in narrative form, it may be necessary to use most of the eighty characters. In this instance, the storage registers required for the operation of the system must have a capacity for all the data required for each line to be printed. The usual mode for operating the solenoid-actuated hammers is to have a thyratron connected to the hammers so that when, as the result of a comparison, an identity is established, the thyratron is fired. Thus, for this type of output printing, an 80-character register and 80 thyratrons are required. However, in the normal course of business activity, a narrative type of output is not required. The output printer is usually required to print the information in some type of format employed in a business. These can be the bookkeeping type of format with debits and credits printed out side by side, or the banking type of format where credits, debits, and a current balance are printed within previously designated spaces. These types of output data are in formats which are not 80 characters wide. It would appear, therefore, that it is a simple matter to merely reduce the size of the register and the number of output-controlled thyratrons to the number required for handling the particular forms. However, this leads to an inflexible device in that changes, or additions, in forms do occur in business and without extensive reworking of the high-speed printer connections, the output printer may not be suitable to handle all the forms required.

An object of the present invention is the provision of a format control for an output printer which is flexible.

Another object of the present invention is the provision of a novel arrangement for controlling the format of an output printer.

Still another object of the present invention is the provision of a novel, useful, and inexpensive arrangement which affords a flexible format control.

In the entry of data into an information-handling machine, it is usually entered in the manner in which we are accustomed to read, namely, from left to right. The data entered into the machine is usually encoded with the alphabetical characters being handled in alpha-numeric code and the numbers in the numeric code. Should the data be stored in a medium such as a magnetic drum, or magnetic tape, it is customary to store such data in a form known as parallel-serial. That is, each character in an alpha-numeric code may consist of several binary digits, known hereafter as bits, which are adjacent parallel tracks on the tape. Thus, if entry of a word is from left to right using parallel-serial storage on tape, the readout from the tape when converted into the human language form will be reversed. For example, the word "chair," unless care is taken to provide the necessary reversal somewhere within the system, will be printed out as "riahc." Similarly, a value, such as 607, is printed out as 706.

A further object of the present invention is to provide a format control circuit which enables the rearrangement of items to be properly readable.

These and other objects of the invention are achieved by providing a format control system which is operated responsive to symbols which are employed with items to identify the different kinds of items. Thus, by way of illustration and not to be considered as a limitation, assuming an information-handling machine is employed in the banking business, it will handle credits and debits usually prefixed by a plus sign and a minus sign, respectively. A plurality of storage registers are employed, each of which is assigned items which are to be printed at a different location along the line. The recognition of an item by its symbol enables the routing of that item to a particular storage register, so that the item may be printed at that portion of a line which has been assigned to items of that type within the form to be printed.

A plurality of means are provided for energizing the solenoids of the print hammers. These means may be the thyratron tubes. There are fewer of these, however, than there are hammers. Each register has a group of these thyratrons associated therewith. There is also provided a means for selectively coupling each of the thyratrons to a different one of the print hammer solenoids responsive to the identifying symbol of an item entered into the register with which such group is associated. This means may be, for example, a selectively actuated crossbar switch which enables the rearrangement of the contents of a register for printing out at a predetermined portion along the line. There is also provided counting means which counts the number of items of each different type which are entered into the registers. In accordance with predetermined form requirements, when the count reaches a predetermined number, the printer is actuated to print out the contents of the register and no new data is entered until such time as the printer has completed its operation.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 illustrates a typical layout on a memory, such as magnetic tape, of data desired to be printed out on an output printer;

FIGURE 2 illustrates a typical form to be printed out from the data illustrated in FIGURE 1;

FIGURE 4 is a block diagram of a symbol recognition circuit suitable for use in the embodiment of the invention;

Figure 3:
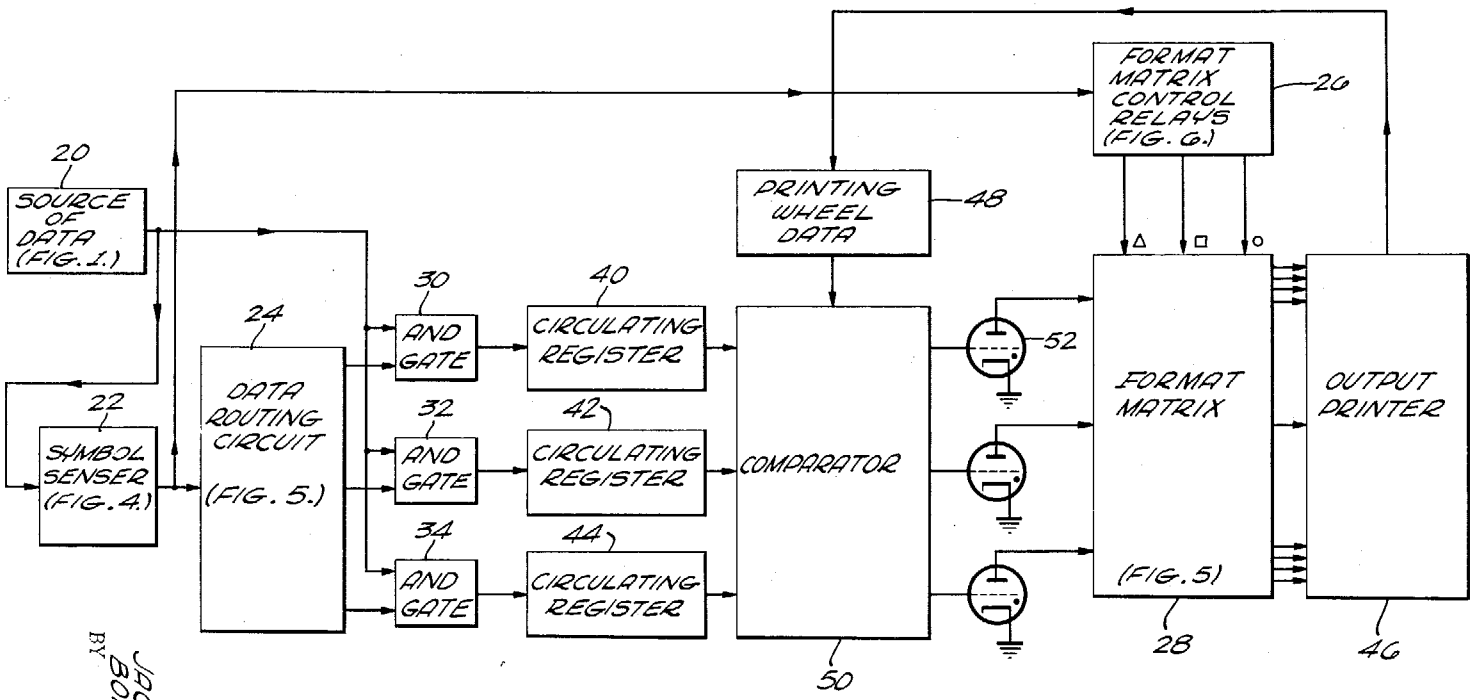
FIGURE 3 is a block diagram of an embodiment of the invention.

In order to facilitate an explanation of the format control principles involved in this invention, the invention will be described in connection with an operation in the banking field, wherein the activity of each depositor's account is printed out. This type of information is obtained when it is desired to see what activity has occurred in the accounts of depositors with the bank. This illustration is not to be construed as a limitation on the invention, since from the following description those skilled in the art may readily appreciate how this invention can be extended for other formats and for other businesses.

In this connection, it is assumed that the information-handling machine is of a type which has, for example, as the internal memory, a magnetic tape recording arrangement. On that tape is recorded the name of each depositor, the transactions for that depositor's account, and other associated information. When an activity printout is required, the output printer is actuated, as well as the source of data, namely, the magnetic tape, so that the output printed material will contain the name of the depositor, the transactions occurring in his account, consisting of debits and credits, and also an item count, which is merely a total of all the debits and credits which have occurred. This information can serve as the basis for a service charge by the bank.

Reference is now made to FIGURE 1, which shows the manner in which the information is recorded on tape. Obviously, the information is recorded in a coded form and is not written, as shown in FIGURE 1. However, in order to assist in an explanation of the invention, the tape sections 10A and 10B shown in FIGURE 1 illustrate the arrangement which the coded information would take. Thus, the tape section 10A, for any given depositor, will contain the following information. First, there will be a code symbol here represented by a lambda, followed by the first name of the depositor. Then will be a second code symbol lambda, indicative of a name item, followed by the second name. If a third name were present, then the lambda would precede that third name. Thus, the name "John Doe," as shown in the tape section 10B, require two lambda symbols. After the area of the tape reserved for the name, the transactions involved follow. Thus, John Doe has had two debit items, indicative of the fact that two withdrawals were made, and two credit items, indicative of the fact that two deposits were made. Each debit item is preceded by a symbol representative of a minus; each credit item is preceded by a symbol representative of a plus. In the illustrative example, the first debit is −326, the second −874; the first credit is +523, the second is +049. The characters are read in time sequence from left to right on the illustration. Dollar values are recorded with least-significant digit first, in order to simplify arithmetic operations. Thus, the amounts being handled are $6.23; $4.78; $3.25; and $9.40. As will be pointed out later, one of the advantages of the format control system, which embodies this invention, is that there is no need for the carrying within the information-handling machine of the decimal point. This will be supplied by the format control. At the end of the space allotted for transactions, there will exist a location known as the item-count location. The item-count location will have a symbol "I," followed by an item number which is the total number of transactions which have occurred.

In the printing out of this information, certain rules for the format are specified. The first rule is that there shall not be any more than three words or items per line; there may be less. A second requirement on the form is that there shall not be more than one credit item per line. A third rule is that there may be one or two debits maximum per line. A fourth rule is that there shall only be one item count on a line. Another requirement is that there shall be three name words per line wherever possible and a last requirement is that no items shall appear on the same line as a name word. These rules are represented in the table form below:

| | | |
|---|---|---|
| D | D | C |
| D | | C |
| | | C |
| D | D | |
| I | | |
| Λ | Λ | Λ |
| Λ | Λ | |
| Λ | | |

D=Debit; C=Credit; Λ=Name word; I=Item count.
3 Words per line maximum.

Note that two debits and a credit may appear on the same line, or a debit and credit, and that all words are restricted to specific columns.

Reference is now made to FIGURE 2, which shows a sample of an activity printout which was made for the section of tape shown in FIGURE 1. Assume that there are 15 printing spaces in the form desired for activity printout, the full name of the depositor appears across the top of the form. On the next line there appears two debits and one credit. It should be noted that the decimal points and the spaces between the debits and credits are provided by the format control apparatus, in accordance with this invention. Thus, there is no burden placed upon the information-handling machine storage facilities to provide spacing and decimal point information. On the next line there appears the second credit underneath the first credit. On the last line there appears the item count. It should be appreciated that the arrangement shown in FIGURE 2 may be extended to include other information, such as balance remaining at the end of the activity, any special charges to be included as debits, and possibly the account number or the address for the particular depositor in addition to his name. From a description of the invention which follows, it will become clear how to make provision for format control, using any desired disposition of the information to be written and also using any desired rules as to the sequence on a line of information—also, providing for the orientation of the item letters within each, the type of information on a line, and the amount of information of any particular type on a line.

FIGURE 3 is a block diagram of an embodiment of the invention. A source of data 20 provides as its output coded signals representative of the information to be printed out. This source of data may be the magnetic tape of the type shown in FIGURE 1. A requirement for the data in accordance with this invention is that there be included a means of recognizing the types of items of data which are to be printed out. One recognition arrangement in accordance with this explanation and as shown in FIGURE 1, is a symbol which precedes the particular item. In accordance with the illustration used herein the symbol consists of a lambda, the minus or plus sign, and an I. The means of recognition can also be the length of the item words or its physical location relative to other items on the tape or within the memory used to retain the source of data.

For the purposes of this explanation, a symbol senser 22 senses the output from the source of data 20. The symbol senser recognizes the particular type of data which is being emitted from the source and applies this recognition output to a data-routing circuit 24 and also to a rectangle labeled "format-matrix-control relays" 26. These format-matrix-control relays are operated to establish predetermined connections in a format matrix 28.

The output of the data-rounting circuit is applied to a plurality of And gates 30, 32, 34. Only one of these And gates is enabled as a result of the information received from the data-routing circuit. Thus, that And gate is enabled and can apply data from the source which is also being applied to the And gates to one of the succeeding registers 40, 42, 44. A plurality of registers 40, 42, 44 are provided. The information contained in each register is informaton which is to be printed within a certain location along the line. Thus, register 40 is assigned information which is to be printed at the beginning of a line, register 42 is assigned information which is to be printed in the middle of a line, and register 44 is assigned information which is to be printed at the end of a line. The function of the data-routing circuit is to enter the data into the particular register to assure print-out of that data at the location in accordance with format requirements. It should be further noted, however, that the location of the printing of the data in the registers may be made subject to any desired further modifications by the format matrix 28.

A rectangle labeled output printer 46 represents the rotating cylinder, or drum, which has the type columns on its periphery. At a printing position, printing occurs. The output printer also has hammers which are separately actuated by solenoids when it is desired to print a particular character. The column of type at the print location is identified by means of information provided from either markings on the type drum periphery or an auxiliary code wheel which is rotated along with the drum.

A rectangle identified as the printing-wheel data 48 represents any of the well-known arrangements for identifying the type at the printing position to enable print-out. The registers 40, 42, 44 are known as circulating registers, and they circulate their contents once for each type character while the output printer drum goes through a complete revolution. The paper on which the printing occurs only advances the distance for a single line after the output printer has made its first revolution. Since the registers are only loaded with information to enable the print-out of a single line, it will be seen that by circulating their contents once for each type character at the printing position, a single line of information is printed out.

The circulating registers have their contents compared with the printing wheel data by means of a comparator 50. When, as a result of a comparison, it is established that characters in the register are the same as the one present at the print-out position, then one or more thyratrons 52, 54, 56 are fired. Each fired thyratron, in turn, pulls current through the solenoid in the corresponding position in the output printer and actuates the hammer, whereby the printing of a character is made in its proper position.

In the usual case, there is a one-to-one relationship between the thyratron and the solenoid-actuated hammer, so that when a character in the fifth position along the line is identified as being present at the print-out position, the fifth thyratron is excited and actuates the fifth solenoid for print-out. In the present invention, however, there is no such assignment of thyratrons to hammers. Although, for example, an output printer may have 80 characters in a column of type and 80 solenoid-actuated hammers, the number of thyratrons and the register capacity required is far less than this. The number of thyratrons and register capacity, in accordance with the present invention, should only equal the maximum number of items to be printed on a line within a particular form. Thus, in an embodiment of the invention which was built for banking practices, only 36 thyratrons were required, and the maximum register capacity was that for 36 characters. The format-switching matrix performed the function of switching the thyratrons to connect them to whichever ones of the output printer solenoids were required in the particular format which was to be employed. It is therefore evident how the apparatus may be employed to provide considerable flexibility in the format of the information printed out. It may also be seen that the amount of apparatus actually required is considerably reduced from that usually employed in these systems.

The symbol senser 22 is also called a "code-recognition circuit." It is well known in the art and is shown, for example, in Patent No. 2,648,829 to Ayres and Smith. To complete this explanation, FIGURE 4 is a block diagram of a code-recognition circuit suitable for utilization in the embodiment of the invention. Assuming a code having four binary digits, or four bits, the symbol lambda may be represented by "1100." The symbol + may be represented by "1010." The symbol minus may be represented by "0011," and the symbol I by "0110."

As shown in FIGURE 4, four reading amplifiers 60, 62, 64, and 66 are employed, each one of which is connected to the reading head (not shown) over one of the parallel tracks on the tape. The output of these four reading heads are applied to four flip-flop circuits 70, 72, 74, 76. These flip-flop circuits, as is well known, have two stable states, the first of which is known as a reset state, and the second of which is known as the set state. They may be driven from reset to set by the application of pulses. The outputs from the four amplifiers 60 through 66 are applied to these four flip-flop circuits 70 through 76. In the presence of a one, the flip-flop circuit is driven from its reset to its set condition. In the presence of a zero, it is not so driven. Instead, it remains in its reset condition. Between each reading of a character on tape, consisting of four bits, the reset pulse is applied to reset the flip-flop circuits 70 through 76 so that they are in condition for the next reading.

Now, looking at the coded arrangement of the symbols, it can be seen that the symbol "lambda" is characterized by the sequence 1100. The symbol "plus" is characterized by the sequence 1010. The symbol "minus" is characterized by the sequence 0011. And the symbol "I" is characterized by the sequence 0110. Thus, all that is required for the symbol-sensing arrangement is to sense the coincidence of the appropriate groupings of "one" and "zero" positions in the outputs of the flip-flops 70 through 76.

And gate 80, accordingly, requires, in order to produce an output, that a "one" be present in the two highest-order digit positions, or that flip-flops 70 and 72 be set and that "zero" be present in the two lowest-order digit positions, or that flip-flops 74 and 76 be reset. And gate 82 requires that a "one" be present in the second and third digit positions and a "zero" be present in the first and third positions, or that flip-flops 72 and 74 are set and 70 and 76 be reset, and then it will produce an output. And gate 84 requires an input from the set states of flip-flops 70 and 74 and the reset states of 72 and 76 before it produces an output indicative of the presence of a plus symbol. And gate 86 requires the flip-flops 74 and 76 to be in their set conditions and flip-flops 70 and 72 to be in their reset conditions, whereupon it provides an output indicative of a minus symbol.

Figure 5:
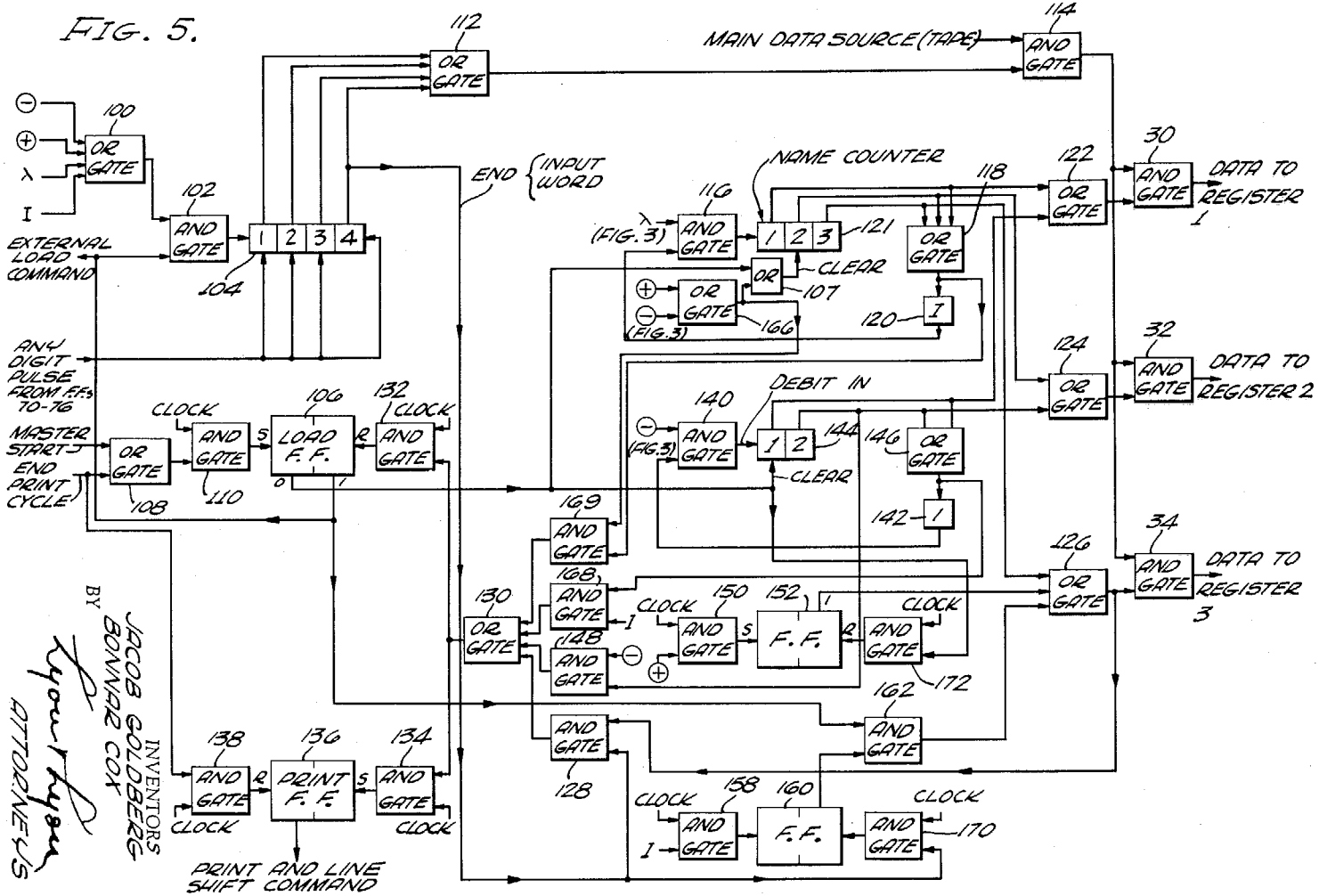
FIGURE 5 is a block diagram of a typical data-routing circuit suitable for use in the embodiment of the invention.

The outputs from the symbol senser are applied both to the data-routing circuit 24 and to the format-matrix-control relays 26. FIGURE 5 is a block diagram of the data-routing circuits. An Or gate 100 receives the output from all of the And gates 80 through 86 shown in FIGURE 4. The output of the Or gate is applied to an And gate 102. This And gate requires as its second input before it can advance a following ring counter 104 from its zero, or standby state, the one or set output from a load flip-flop 106. This load flip-flop 106 is set by the application of a master start pulse which initiates the operation of the system. This pulse may be manually or automatically produced from the information-handling machine. The master-start pulse is applied to an Or gate 108. This Or gate also receives as its alternative input a pulse from the output printer indicative of the fact that a whole line has been printed and, therefore, a print cycle is ended. The output of the Or gate 108 is applied to an And gate 110. A second enabling input to the And gate 110 is a clock pulse from a clock-pulse source, not shown. The clock-pulse source is the well-known source of synchronizing pulses which are used in present-day information-handling machines to synchronize the operation of the system. Thus, following the application of either a master-start pulse or a pulse from the output printer indicative of the fact that it has completed printing a line, the load flip-flop will be driven to its set condition.

The output of the load flip-flop 106 is applied to enable the And gate 102, and also, as signified by the label "external load command," to signal to the apparatus in the information-handling machines, which in FIGURE 3 is represented as source of data 20, that the output printer is now ready to receive data. Thus, when the data begins to flow into this apparatus, And gate 102 is in condition to advance the counter 104 to its first count from zero count each time a symbol output is received from the symbol senser as well as word digit pulses. The counter advances a count for each digit in an item read from the tape. Thus, on the basis that a four-digit fixed word length for each item (filled out by zeros where needed) is employed, the counter need only count four.

Its fourth count signifies the end of the input word. Thus, counter 104 is a digit counter and goes through a complete cycle of counts for each word that is read. Its last, or fourth count signifies the end of a word. It should be appreciated that the number of counter stages may be varied, as required. A preferred type of ring counter is described and shown in an application for a Gated-Delay Counter, by James E. Heywood, Serial No. 400,645, filed December 28, 1953, and assigned to a common assignee. In any event, the output of each stage of the counter, aside from the zero or standby stage, is applied to an Or gate 112. The output of this Or gate 112 is applied as an enabling input to an And gate 114. The output of And gate 114 represents the data being supplied from the data source. Accordingly, the second input to the And gate 114 is data from the source 20. The output of And gate 114 is fed to three And gates 30, 32, 34, which will be recognized as the And gates shown in FIGURE 3, which are controlled by the output of the data-routing circuit 24.

The output of the And gate 80 (FIGURE 3), consisting of a signal whenever a lambda appears, is applied to an And gate 116. This And gate has as its second required input the output of an inverter 120, which occurs when there is no input to the inverter. Expressed alternatively, inverter 120, whenever an input is received from an Or gate 118, inhibits And gate 116. The input to the Or gate 118 consists of the output of any of the counting stages of the counter 121 when a count is entered in the counter. Counter 121 consists of three flip-flops which, at standby, are all in their reset conditions. At this time, no output is applied to the Or gate 118. The flip-flops following the first stage are set successively upon the lambda being applied to the counter stages—only a stage following a set stage being set by the lambda and the preceding stage being reset. A counter of this type is shown in the above-noted application for a Gated-Delay Counter. The reason the counter has three counting stages is that in accordance with the rules previously set forth three name words maximum may occupy any one line. Thus, each time a lambda symbol pulse is received, the counter 121 is advanced one count.

The set output from the first count stage of counter 121 is applied to an Or gate 122. This Or gate provides the second required input to the And gate 30, so that the characters which follow the lambda signal will be entered into the first circulating register 40. The set output of the second count stage of the counter 121 enables And gate 32 through an Or gate 124. Therefore, the characters of the second name word which follows the second lambda will be entered through the And gate 32 into the second register 42. The third lambda transfers the counter to its third count condition, whereupon an Or gate 126 is enabled to apply an output to the And gate 34, whereby the data will be directed to enter the circulating register 44. The counter 121 will remain in its third count condition until flip-flop 106 is reset. The reset output of flip flop 106 is applied to reset the counter through a "clear" Or gate 107.

It should be noted that along with the counter 121 the counter 104 will be counting. When the fourth count condition signifying the end of the input word has been reached, the output of the counter 104, which occurs after the last digit of the last name word, is applied to an And gate 128. The second required input for this And gate 128 is received from the output of Or gate 126, which occurs when lambda counter 121 is in its third counting condition. And gate 128 applies its output to an Or gate 130. The output of Or gate 130 is applied to an And gate 132, which, upon receiving a clock pulse from the synchronizing pulse source, resets the load flip-flop 106, thereby terminating the further entry of data at that time into the data-routing circuit.

The output of Or gate 130 is applied to another And gate 134. This And gate, upon receiving a clock pulse, sets a print flip-flop 136. The output of the print flip-flop, upon being set, commands the output printer system to commence the operation of printing out the information which is contained in the registers. This involves the circulating of the contents of the register and the comparison of them with the printing-wheel data. Upon the end of the printing cycle occurring, the end-print cycle output is received and applied to the Or gate 108 and to an And gate 138. The And gate 138 resets the print flip-flop when a next clock-pulse occurs. The output of the Or gate 108 sets the load flip-flop, whereupon the next output from the data source may be loaded into the registers.

What has just been described is the way in which name words are handled. Assume that two debits now occur. The output of the And gate 86 in FIGURE 4, which is a debit signal, is applied both to the counter 104 and to an And gate 140. The output of the And gate 140 receives as its second enabling input the output of an inverter 142. A two-stage counter 144, which is identical with the counter 121 described previously, supplies output from each count stage when set to an Or gate 146. The output of this Or gate 146 is applied to the inverter 142. This inverter will therefore inhibit And gate 140 so long as the counter is in an other-than-zero-count condition. The counter advances each time an advancing pulse is applied to the various stages. This advancing pulse is provided by recognition of the minus symbol. The counter is reset or cleared by an output from the load flip-flop 106 when it is reset.

Upon the first count of the debit counter, And gate 30 is enabled through Or gate 122, whereby the debit data is entered through And gate 30 into the register 40. Upon the second debit entry being identified by its symbol, the counter 144 is advanced to its second count, whereby Or gate 124 can enable And gate 32 and the second debit item is entered into the register 42.

Upon attaining its second count, the counter 144 also applies its output to an And gate 148. This And gate is enabled only if a third debit item symbol occurs. In accordance with the rules previously mentioned, only two debit items may be written on a line, and therefore upon the occurrence of a third debit item symbol And gate 148 is enabled. Its output is applied to the Or gate 130, which thereupon proceeds to reset the load flip-flop and set the print flip-flop. At the end of the print cycle, And gate 110 is again enabled and the data can again be entered from the source into the registers. If two debits are followed by a credit, there will be no minus sign seen after the second state of counter 144, so that a print cycle will not be initiated until after the credit item is read.

The credit-item symbol, or + signal, from And gate 84 is applied to an And gate 150. Upon the occurrence of the next clock-pulse, the flip-flop 152 is set by the output of the And gate. This permits Or gate 126 to enable And gate 34 so that the following credit item is entered into the third circulating register 44. The output of Or gate 126, as previously explained, is also applied to And gate 128. Counter 104, which counts the digits, provides And gate 128 the second required enabling pulse at the end of the input credit item. Note that one or two debit items may precede the credit item on the same line. Therefore, at the end of the credit item, the print-out cycle is authorized by flip-flop 136.

When an item-count symbol signal, I, is received, it is applied to And gate 158 from And gate 82 in FIGURE 4. The output of And gate 158 is applied to a flip-flop 160. This flip-flop is set and applies its output to an And gate 162. The second required input to And gate 162 is the output of flip-flop 106, the load flip-flop, when it is set. The output of And gate 162 is applied to an Or gate 126, which, as previously described, enables And gate 34 so that the incoming item data may be entered into the third register 44. The output of the Or gate 126 is also applied to And gate 128, which, as previously explained, is enabled upon receiving the signal from the counter 104, indicative of the end of the input item word. Thus, the item is printed on a line by itself at the portion of the line which is controlled or allotted to the register 44.

In order to further carry out the rules set forth previously, a name word must appear alone on a line without any debit or credit items. To insure this, the output of Or gate 118, which receives an output from the counter 121 when in any one of its counting stages other than zero, is applied to an And gate 169. The second required input to this And gate is the output of an Or gate 166. The input to this Or gate is either a minus or plus symbol pulse. Not only does the output of Or gate 166 serve to enable And gate 164 to order a print-out, whereby only name words on any line are obtained, but also the output of this Or gate is applied to the "clear" Or gate 107, which resets or clears the counter 121 to its standby condition.

Another And gate 168 serves the function of insuring that when an item count number is received following the entry of one or two debits that those debits are printed out on a line by themselves. Thereafter, the item which follows can be entered on a line by itself and not on the same line with the debit. This is assured by applying to the And gate 168 as one required input the item symbol pulse and as the second required input output from either stage of the debit counter 144.

From the above description, it should be clear how the rules previously set forth for the format described are carried forth by the logic provided. The item symbol enables recognition of the data which follows, so that suitable logic controlled thereby enables the input of that data to one of the registers, each of which controls a given portion of a line. Thus, the item is entered into a register which eventually will secure the printing out of that item in the proper portion of a line. By further logic, the number of items on a line and the kinds of those items are also controlled in accordance with the format rules previously laid down.

Once the items are entered into the registers, the comparison operation of the system, with the columns of type appearing under the print-out position, are achieved in well-known manner. It should be noted that when the load flip-flop 106 is reset, the reset, or zero, output thereof is used to clear the counters 121 and 144 and through And gate 172 to reset the flip-flops 152 upon the occurrence of the next clock pulse. Flip-flop 160 is reset by the end input word output of counter 104 through And gate 170. Thus, the apparatus is put in condition for the next cycle of operation.

Once the registers are loaded, the next operation to occur is that of comparing the contents of the registers with the columns of type appearing at the printing-out positions. Apparatus for securing this type of operation is well known. A preferred arrangement is shown, described, and claimed in an application by these inventors for output printer control system.

Figure 6:
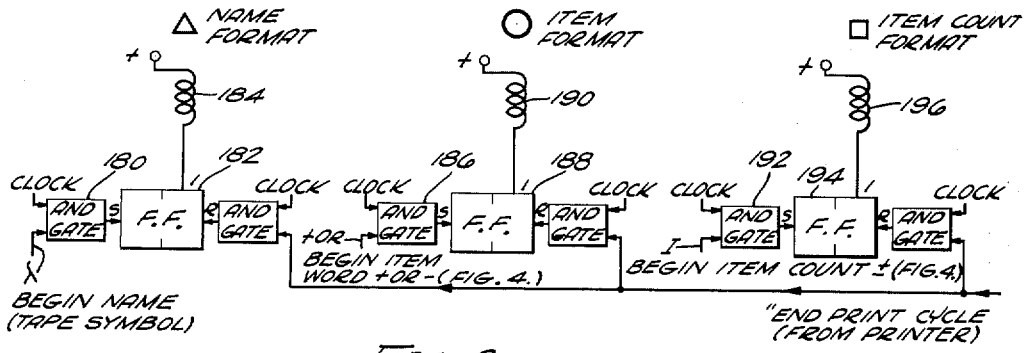
FIGURE 6 is a block diagram of an arrangement of format control relays suitable for use in the embodiment of the invention.
Figure 7:
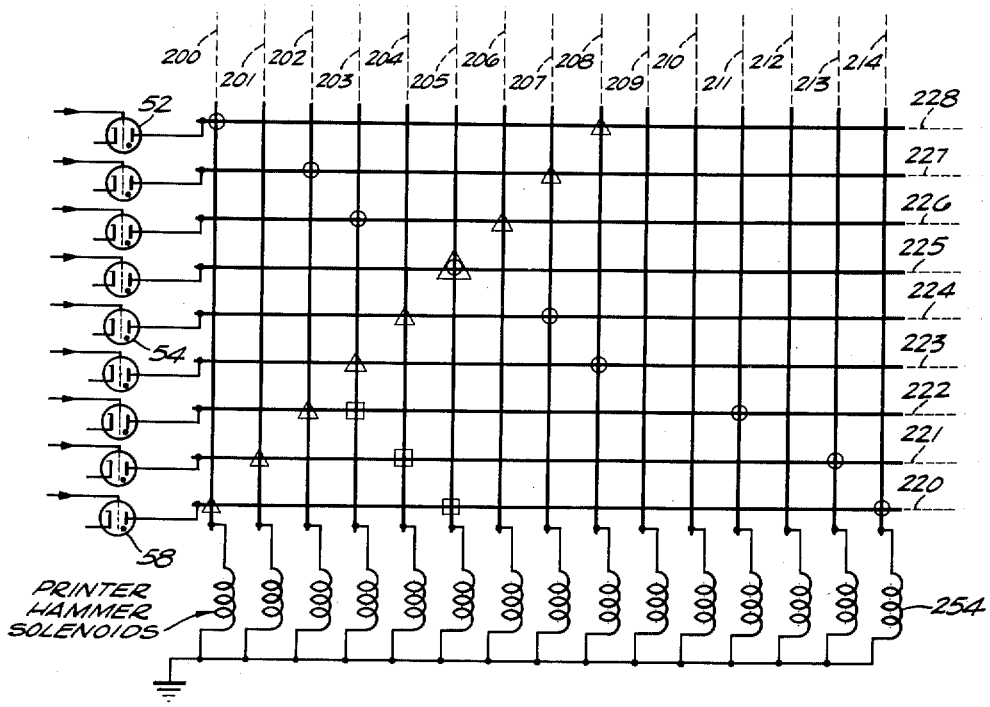
FIGURE 7 is a schematic diagram of a crossbar relay showing its utilization in coupling thyratrons to hammers to achieve format control in accordance with this invention.

In FIGURE 3, format control is further secured by the format matrix 28, which is operated by the format-matrix-control relays 26. The format-matrix-control relays are shown in FIGURE 6. The lambda pulse signal, which is received from the And gate 80 in FIGURE 4, is applied to an And gate 180. Upon the occurrence of a clock pulse, this And gate output will set a flip-flop 182. When this flip-flop is in its set condition, it energizes a relay 184, the coil of which is shown in FIGURE 6. This relay, in turn, serves to close contacts, not shown, which are disposed within the format matrix 28 to secure the name format on a line. These contacts are identified in FIGURE 7 by a triangular symbol Δ. Each such symbol on FIGURE 7 represents a connection of the two bus-wires enclosed within the symbol.

A plus or a minus symbol pulse output from And gates 84 or 86 is applied to an And gate 186 in FIGURE 6, whereby upon the occurrence of the next clock pulse, a flip-flop 188 is set and thereby it energizes a relay 190, which controls the closing of contacts (not shown) in the format matrix to insure the item format. These contacts are identified by a circle ○ in FIGURE 7.

The item count symbol pulse output from And gate 82 in FIGURE 4 is applied to And gate 192, the output from which, upon the occurrence of the next clock pulse, set flip-flop 194. In its set condition, flip-flop 194 energizes a relay 196. This secures the closure of contacts (not shown) in the format matrix to insure that the item count format is achieved. These contacts are identified in FIGURE 7 by a rectangle ▭.

Each time an end-print cycle signal is received from the output printer, indicative of the fact that a line of type has been completely printed, all the flip-flops 182, 188, and 194 are reset. Adjacent each one of the relay coils 184, 190, 196 are the symbols which are employed in FIGURE 7 to identify the contacts which are controlled by that particular relay.

Referring now to FIGURE 7, there is essentially shown a matrix consisting of column busses and row busses with a pair of normally open contacts existing at each row and column bus intersection. This effectively describes the setup of a crossbar relay which may be employed, if desired. Pairs of the contacts at the row and column bus intersections are closed by energization of the relay shown in FIGURE 6 having the symbol corresponding to the one shown at the intersection of the busses.

In order to secure the format shown in FIGURE 2, the name-format relay 184 must close the contacts at the intersections which are designated by the small triangles. There is a correspondence between the row busses and a position for each character forming the contents of each of the three registers. It will thus be seen that by preselecting the contacts to be closed in the matrix which connect thyratrons driven from each register and selected ones of the hammer solenoids, the printed out locations of the characters forming words or items may be rearranged. Thus, an inversion of the register contents may be obtained, as well as any required spaces between the items in accordance with the format set forth in FIGURE 2. A decimal point may always be called for with number items after the cents amount.

Great flexibility is afforded, if desired, by bringing out the row and column busses to a plug-board from which connections may be arranged as desired to the various relays actuated by symbols.

As pointed out previously, the explanation of the invention was in connection with a banking operation. It should be apparent that other business practices may be handled just as easily, since deposits and withdrawals—or credits and debits—or deposits and purchases are a common business language, and the symbols may be the same for each. The apparatus described may be readily expanded to handle larger item words by enlarging the size of the registers and counters, as required. More items may be handled by paralleling the logic circuits shown in FIGURE 5 with similar logic for the additional items in accordance with their particular format rules.

Accordingly, there has been described and shown herein a novel, useful, and simple arrangement for obtaining the format control of an output printer. The arrangement is very economical and flexible and enables the utilization of the same circuitry for any number of different format arrangements.

We claim:

1. A format-control system for printing data derived from a source, said data consisting of different kinds of items, each kind being identified by a symbol, said printer having columns of type on a rotating drum periphery, a plurality of solenoid-actuated print hammers, a printing position at which a line may be printed, and means to indicate the type on said drum at said printing position, said format-control system comprising a plurality of storage registers, each of which is assigned to hold items for printing at a different portion of a line, means responsive to a symbol from said source identifying items of data from said source to enter said items of said data into different ones of said registers in accordance with predetermined line position assignments, a plurality of means for energizing the solenoids of said print hammers, and means for selectively coupling each of said means for energizing to a different one of said solenoids responsive to the identifying symbol of an item entered into a register to establish the arrangement of said item on a printed line.

2. A format-control system for printing data from a source, said data consisting of different kinds of items, each kind being identified by a different symbol, said printer having columns of type on a rotating drum periphery, a plurality of solenoid-actuated print hammers, a printing position at which a line may be printed, and means to indicate the type on said drum at said printing position, said format-control system comprising a plurality of storage registers each of which is assigned items for printing at a different portion of a line, means for identifying different item symbols, means for entering items of data into different ones of said registers in accordance with prearranged line position assignments responsive to the symbol identification by said means, a plurality of means for energizing the solenoids of said print hammers, and means for establishing the arrangement of an item on a printed line including means for associating different groups of said means for energizing with different ones of said registers, and means for selectively coupling each of said means for energizing to a different one of said print hammer solenoids responsive to the identifying symbol of an item entered into a register.

3. A format-control system for printing data from a source as recited in claim 2 wherein the number of means in said plurality of means for energizing the solenoids of said print hammers is less than the number of solenoid-actuated print hammers.

4. A format-control system for printing data from a source, as recited in claim 2, wherein said means for entering items of data into ones of said registers in accordance with prearranged line position assignments includes a separate means for counting each different item symbol identified by said means for identifying, means responsive to the count in each said separate counting means to enable a predetermined one of said registers to receive the item the preceding symbol for which has just been counted, and means responsive to a predetermined count in said separate counting means to prevent further items from being entered into said registers until after the items already present are printed out.

5. A format-control system for printing data as recited in claim 2 wherein said means for selectively coupling each of said means for energizing to a different one of said print-hammer solenoids responsive to the identfiying symbol of an item entered into a register includes a plurality of pairs of normally open relay contacts, means for coupling one contact of a different pair of said relay contacts to a different one of said means for energizing and the other contact to a different one of said print-hammer solenoids, and relay means for selectively closing predetermined ones of said pairs of relay contacts.

6. In an output printer of the type having columns of type on a rotating drum periphery, a plurality of solenoid-actuated print hammers, a printing position at which a line may be printed, and means to indicate the type on said drum at said printing position, apparatus for controlling the format for printing data from a source, said data consisting of different kinds of items, each kind being identified by a different symbol, said apparatus comprising a plurality of storage registers, each of which is assigned items for printing at a different portion of a line, means for identifying different item symbols, means for entering different items of data into preassigned different ones of said registers responsive to symbol identification by said means, means for establishing the number of each different item entered into said registers, means responsive to predetermined numbers of different items established by said means for establishing for preventing further items from being entered into said registers until the items already present are printed out, a plurality of means for energizing the solenoids of said print hammers, and means for establishing the arrangement of an item on a printed line including means for associating different groups of said means for energizing with different ones of said registers, and means for coupling in a predetermined manner each group of said means for energizing to a different one of said print-hammer solenoids responsive to the identifying symbol of the item in the register associated with the group.

*7. A format-control system for printing data derived from a source, said data consisting of different kinds of items, each kind being identified by a symbol; a printer associated with said control system, said printer having columns of type on a rotating drum periphery, print hammer means, a printing position at which a line may be printed and means to indicate the type on said drum periphery at said printing position; said format-control system comprising storage means for holding items for printing at a different portion of a line; means responsive to a symbol from said source identifying items of data from said source to enter said items of said data into said storage means in accordance with predetermined line position assignments; means for energizing said print hammer means; and means responsive to the identifying symbol of an item entered into said storage means for causing the printing of said item on a predetermined position in a line.*

*8. A format-control system for printing data from a source, said data consisting of different kinds of items, each kind being identified by a symbol; a printer associated with said control system, said printer having columns of type on a rotating drum periphery, a plurality of solenoid-actuated print hammers, a printing position at which a line may be printed and means to indicate the type on said drum periphery at said printing position; said format-control system comprising storage means for holding items for printing at a different position of a line; means responsive to a symbol from said source identifying items of data from said source to enter said items of said data into said storage means in accordance with predetermined line position assignments; means for energizing the solenoids of said print hammers and; means for coupling said energizing means to a chosen solenoid responsive to the identifying symbol of an item to establish the position of said item on a printed line.*

*9. In information responsive apparatus having output printing means, said printing means comprising columns of type on a rotating drum periphery; storage means for holding different items of data for printing at different respective portions of a line, each kind of item being identified by a different symbol, means for identifying different item symbols, means for entering items of data into said storage means in accordance with prearranged line position assignments responsive to the symbol identification by said identifying means, and means responsive to the identifying symbol of an item for effecting the printing of said item on a line in its assigned position by said printing means.*

References Cited in the file of this patent or the original patent

UNITED STATES PATENTS

| | | |
|---|---|---|
| 2,692,551 | Potter | Oct. 26, 1954 |
| 2,776,618 | Hartley | Jan. 8, 1957 |
| 2,800,073 | Block | July 23, 1957 |
| 2,811,102 | Devol | Oct. 29, 1957 |
| 2,858,536 | Johnston | Oct. 28, 1958 |
| 2,874,634 | Hense | Feb. 24, 1959 |